Patented Aug. 18, 1953

2,649,449

UNITED STATES PATENT OFFICE 2,649,449

2-CYCLOHEXYLAMINO-4-AMINO-5-BENZYLPYRIMIDINE

Aaron S. Goldberg, New York, N. Y., assignor to Nepera Chemical Co., Inc., Yonkers, N. Y., a corporation of New York No Drawing. Application April 4, 1952, Serial No. 280,651

2 Claims. (Cl. 260—256.4)

This invention relates to pyrimidine compounds and relates more particularly to the novel compound 2-cyclohexylamino-4-amino-5-benzyl-pyrimidine.

Compounds containing a pyrimidine nucleus are of wide pharmacologic interest since compounds containing the basic pyrimidine structure are known to play an important part in physiological processes. Compounds containing the pyrimidine structure are present in the cell nucleus in the form of nucleoproteins. Vitamin $B_1$, folic acid, and thymine are other important natural substances of pyrimidine structure. Although the study of the physiologically active pyrimidine compounds has occupied the attention of many investigators, the usefulness of many compounds which come within the broad class of pyrimidine compounds has by no means been fully determined since it is well known that relatively small changes in the structure of pyrimidine compounds have been found to cause widely different physiological effects.

It is, therefore, an important object of my invention to provide novel pyrimidine compounds of desirable physiological activity.

Another object of my invention is the preparation of 2-cyclohexyl-amino-4-amino-5-benzyl-pyrimidine.

Other objects of this invention will appear from the following detailed description.

The novel compound of my invention has the following formula:

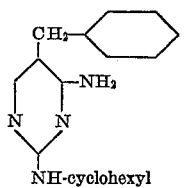

This novel compound has an analeptic action.

To obtain the novel pyrimidine compound of my invention, ethyl formate is condensed with ethyl hydrocinnamate:

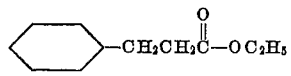

to obtain the intermediate compound ethyl α-formyl hydrocinnamate.

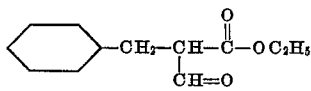

This intermediate may then be reacted with urea, for example, in alcoholic solution and in the presence of some hydrogen chloride to yield the intermediate ethyl α-benzyl β-ureido acrylate

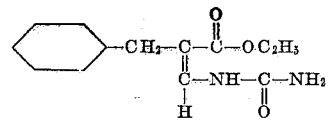

Upon heating the above compound in the presence of a base, such as, for example, 10% aqueous sodium hydroxide, ring closure takes place with the formation of 5-benzyluracil. Treatment of the 5-benzyluracil with phosphorus oxychloride yields 2,4-dichloro-5-benzylpyrimidine. By reacting the 2,4-dichloro-5-benzylpyrimidine with ammonia, there may be obtained 2-chloro-4-amino-5-benzylpyrimidine. Reaction of 2-chloro-4-amino-5-benzylpyrimidine yields the novel compound of my invention, 2-cyclohexyl-amino-4-amino-5-benzylpyrimidine.

In order further to illustrate my invention, but without being limited thereto, the following examples are given:

Example I 67 parts by weight of sodium metal and 2 parts by weight of potassium metal are placed in a reaction vessel, sufficient toluene added to cover the metal and the mixture then heated with some agitation until the sodium and potassium are melted. The toluene is then decanted from the molten alloy and a mixture of 375 parts by weight of ethyl hydrocinnamate, 350 parts by weight of ethyl formate and 850 parts by weight of diethyl ether are gradually added to the sodium-potassium alloy. The addition is made under reflux and at a rate sufficient to maintain the exothermic reaction mixture at a lively boil. Hydrogen is given off as a reaction product. When the addition of the ester mixture is completed and the evolution of hydrogen ceases, the reaction mixture is allowed to reflux for a period of about 1 hour. The mixture is poured on to ice, the aqueous phase separated from the ether phase, and, after washing the ether phase once with dilute aqueous sodium hydroxide, the ether phase is discarded. The aqueous sodium hydroxide phases are combined, acidified with cold hydrochloric acid and the combined acidified aqueous phase then extracted with ether. The ether layer is separated and the ether evaporated under reduced pressure. The formyl ester is then distilled under a pressure of 1 mm. or less. A yield of 70% of ethyl α-formyl hydrocinnamate is obtained as the product.

100 parts by weight of the ethyl α-formyl hydrocinnamate thus obtained are added to a mixture containing 35 parts by weight of urea, 235 parts by weight of absolute ethyl alcohol and 6 parts by weight of ethyl alcohol which has been saturated with hydrogen chloride at 20° C. The mixture thus formed is heated at 50–60° C. for about one hour and, after being allowed to stand at a temperature of about 40° C. for about 12–20 hours, followed by standing for about 16 hours at a temperature of 0–5° C., ethyl α-benzyl β-ureido acrylate crystallizes out. The crystals are filtered, washed with 50% aqueous ethyl alcohol and then with a small amount of ether.

32 parts by weight of the ethyl α-benzyl β-ureido acrylate are placed in a suitable reaction vessel and 54 parts by weight of a 2 N aqueous solution of sodium hydroxide are added. Heating is continued at the boiling point for about 30 minutes. The mixture is acidified with warmed 2 N aqueous hydrochloric acid. A precipitate of 5-benzyluracil is obtained on acidification. The mixture is cooled, the 5-benzyluracil is filtered off and the latter then washed with water and dried. The 5-benzyluracil may then be converted to 2,4-dichloro-5-benzylpyrimidine by reacting the former with an excess of phosphorus oxychloride under reflux for about 3 hours. To separate the 2,4-dichloro-5-benzylpyrimidine, the reaction mixture is reduced in volume by heating under reduced pressure until it becomes slightly syrupy. The syrupy liquid is then diluted with some chloroform, ice is added and, after agitation, the aqueous and chloroform phases are separated. The chloroform layer is washed several times with ice water and dried with sodium sulfate. After boiling off the chloroform, 2,4-dichloro-5-benzylpyrimidine is obtained and may be further purified by distillation under vacuum. This compound has a boiling point of 160° C. under 1 mm. pressure.

*Example II*

5 parts by weight of 2,4-dichlor-5-benzylpyrimidine are placed in a reaction vessel provided with cooling means, the contents cooled to about 0° C., and after 9 parts by weight of absolute ethyl alcohol saturated with ammonia at 0–5° C. are introduced, the vessel is sealed and the temperature permitted to rise slowly to 18–25°. The reaction mixture is allowed to remain at this temperature for about 24 hours. A 1% by weight solution of aqueous ammonia is added until precipitation of the 2-chloro-4-amino-5-benzylpyrimidine formed is complete. The precipitate is filtered off and washed with water. The product may then be recrystallized from benzene. A yield of 94% of theory of 2-chloro-4-amino-5-benzylpyrimidine is obtained, the product melting at 162° C. This is a novel compound.

*Example III*

To one part by weight of 2-chloro-4-amino-5-benzylpyrimidine is added a mixture of 2.5 parts by weight of absolute ethyl alcohol and 2.0 parts by weight of cyclohexylamine. The mixture obtained is heated in an autoclave at a temperature of 100° C. for eight hours. About 10 parts by weight of diethyl ether are added to the reaction mixture and the whole then extracted four times with water, each extraction being with about an equal volume of water. The ether layer remaining is then dried over anhydrous sodium sulfate and concentrated to small volume. Petroleum ether is added to incipient crystallization and the product allowed to crystallize out by cooling the reaction mixture to a temperature of 32° C. for 24 hours. The product may be recrystallized from a mixture of acetone and petroleum ether. A yield of 84% of theory of 2 - cyclohexylamino - 4 - amino - 5-benzylpyrimidine is obtained. This novel compound has a melting point of 128° C.

It is to be understood that the foregoing detailed description is given merely by way of illustration and that many variations may be made therein without departing from the spirit of my invention.

Having described my invention, what I desire to secure by Letters Patent is:

1. The novel pyrimidine compound, 2-cyclohexylamino-4-amino-5-benzylpyrimidine.

2. Process for the production of 2-cyclohexylamino-4-amino-5-benzylpyrimidine which comprises reacting 2-chloro-4-amino-5-benzylpyrimidine with cyclohexylamine.

AARON S. GOLDBERG.

No references cited.